United States Patent [19]
Maples

[11] Patent Number: 4,627,168
[45] Date of Patent: Dec. 9, 1986

[54] GAGE POSITION CONTROL

[75] Inventor: Stephen S. Maples, Adrian, Mich.

[73] Assignee: Acer Automation, Adrian, Mich.

[21] Appl. No.: 706,443

[22] Filed: Feb. 27, 1985

[51] Int. Cl.[4] .............................................. G01B 7/02
[52] U.S. Cl. .................................... 33/169 R; 33/170;
33/125 R
[58] Field of Search ............... 33/170, 169 R, 172 E,
33/125 R, 125 A, 125 C, 143 L, 147 N

[56] References Cited

U.S. PATENT DOCUMENTS

| | | | |
|---|---|---|---|
| 3,373,497 | 3/1968 | Lewis | 33/170 |
| 3,483,626 | 12/1969 | Huttel | 33/172 E |
| 3,996,669 | 12/1976 | Anichini | 33/172 G |
| 4,276,696 | 7/1981 | Ernst | 33/169 R |

Primary Examiner—Harry N. Haroian
Attorney, Agent, or Firm—Beaman & Beaman

[57] ABSTRACT

The invention pertains to apparatus for positioning a gage and structure associated with the gage, such as a protective shield. A gage arm is mounted for linear movement upon a column, and the arm extends through structure which surrounds the arm forming a shield protecting the gaging apparatus from foreign matter. Power means position the gage arm protective shield and sensors determining the relative position between the shield and the gage arm control the position of the shield to prevent the shield from having an adverse effect upon the gage arm measurement. A lost motion linkage may interconnect the gage arm support with the shield for the positioning thereof, or the gage arm support may be positioned independently.

11 Claims, 3 Drawing Figures

GAGE POSITION CONTROL

BACKGROUND OF THE INVENTION

A gage of the arm type wherein an elongated member having a feeler or finger for engaging a part to be measured is commonly supported upon a column or guide rail wherein the position of the gage arm, or supporting structure, may be measured with respect to a predetermined location to produce a measurement reading. Various types of such gages are well known and the measurements produced may be visually observed and read, or may be electronically indicated, such as with digital readout apparatus. Such gaging devices utilize columns, guides and bearings which accurately support the gage arm or probe and must be maintained in a clean condition free from foreign matter if the accuracy of the measurement is to be consistent over extended durations.

It is known to use protective shields or screens with gaging apparatus employing gaging arms and probes to protect the critical portions of the gage from contamination from coolants, oil, metal chips, dirty air and the like. For instance, protective screens and shields are known which utilize a slit parallel to the gage arm path of movement through which the arm extends and resilient lips or baffles which line the slit tend to encompass the arm during its movement and prevent the entry of foreign matter through the slit. Also, it is known to use flexible screens, bellows, lapped plates, and the like which are attached to the gage arm and expand and contract, and change dimension in order to follow the gage arm movement.

While the aforementioned protective screens for gage arms, within limits, provide reasonably effective protection of the gage arm support, bearings, guideways, etc., the protective apparatus for the gage arm will impose upon the gage arm a resistance to movement which may have an adverse effect on the measurement being conducted. For instance, wherein the gage arm is supporting the weight of the protective shield, or the movement of the gage arm through a slot is impeded by the necessity to displace flexible baffles, such forces may be imposed upon the gage arm at the point of contact with the workpiece being measured preventing a consistent measurement in that the pressure of engagement between the gage and article being measured must be constant and free of external influence.

It is an object of the invention to provide gage positioning and protective apparatus wherein the protective apparatus shields gage structure from contamination by foreign matter and yet imposes no external influence on the gaging apparatus as to adversely affect the gaging procedure.

Another object of the invention is to provide gage positioning apparatus for a linear movable gage arm wherein protective apparatus is linearly positionable by power drive means and wherein the relative positions between the gage apparatus and protective structure is sensed by means controlling the power drive to automatically produce a predetermined relationship between the gage and protective structure.

An additional object of the invention is to provide a linear movable gage having protective structure wherein the protective apparatus is positioned by power drive means automatically controlled by sensing apparatus producing a predetermined relationship between the gaging and protective structure, and wherein the protective structure is interconnected by lost motion and a counterbalancing linkage.

In the practice of the invention, a gage arm or probe is mounted for linear displacement upon a column by means of a low friction bearing. Measuring apparatus is associated with the gage arm, which may be either of a mechanical, optical, or electrical construction wherein the position of the gage arm may be accurately determined for measurement purposes.

The gage arm extends through a protective shield, or surround, which includes a protective shield interposed between the gage bearing and column and the contaminating environment, and the protective apparatus is movable through a linear path corresponding to the operative path of movement of the gage arm.

The protective shield, in the disclosed embodiment, is positioned by an electrically powered drive consisting of a threaded shaft bidirectionally rotated by a reversible electric motor. Sensors mounted upon the protective shield at the location where the gage arm extends through the shield determine the relative position between the shield and gage arm and control the electric motor drive to produce a predetermined relationship between the gage arm and shield during gaging operation to insure that the shield does not impose an external influence upon the gage arm during the measuring process.

The gage arm may be moved upon its column by independent drive means, and in such instance, the protective shield apparatus will "follow" the movement of the gage arm under the control of the sensors which maintain the desired relationship between the gage arm and protective shield through operation of the shield power drive.

However, it is also possible to position the gage arm to the gaging position by the protective shield apparatus and the drive means therefor. This embodiment utilizes a lost motion and counterbalancing interconnection between the protective structure and the gage arm support which permits the protective shield drive means to function as the power positioning apparatus for both the gage arm and the protective support. In the described embodiment, the lost motion and counterbalancing connection between the protective structure and gage arm is achieved by tension springs.

BRIEF DESCRIPTION OF THE DRAWINGS

The aforementioned advantages and objects of the invention will be appreciated from the following description and accompanying drawings wherein.

DESCRIPTION OF THE PREFERRED EMBODIMENTS

Figure 2:
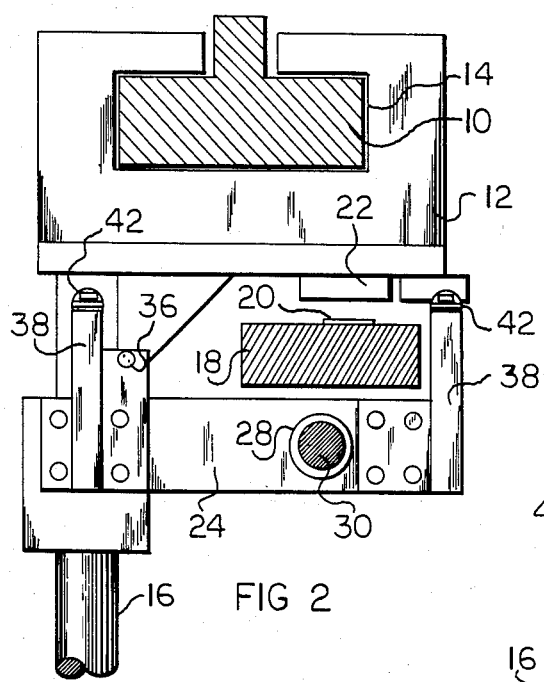
FIG. 2 is a plan sectional view as taken along Section II—II of FIG. 1.

With reference to the drawings, a column is represented at 10 which is fixed upon a base or mounting structure, not shown, located adjacent the workpiece, or the like, not shown, which is to be measured. Normally, the column will be vertically oriented, but may be horizontal or otherwise positioned. As appreciated from FIG. 2, the column 10 is of a rectangular configuration having accurately machined spaced parallel surfaces, and a bearing 12 having a rectangular opening 14 receives the column wherein the bearing is capable of accurate linear displacement thereon.

Preferably, anti-friction means are interposed between the column 10 and bearing 12 wherein very low frictional resistance is encountered as the bearing moves upon the column, and preferably, the bearing comprises an air bearing wherein a cushion of air exists between opposed adjacent surfaces of the column and bearing to reduce frictional engagement therebetween, but assures accurate support of the bearing on the column. The particular construction of the air bearing constitutes no part of the present invention, and known air bearing constructions may be utilized.

A gage arm 16 is affixed to the bearing 12 and extends therefrom at right angles to the length of the column 10. The gage arm as shown comprises a cylindrical rod and includes a finger or probe, not shown, at its outer free end adapted to engage the workpiece or part to be measured. When the gage arm is in contact with the part being measured, the bearing 12 will be stationarily positioned relative to the column 10, and by measuring the position of the bearing, the desired measurement of the member being engaged by the gage arm 16 can be determined. This measurement is achieved by a scale support 18 mounted adjacent the bearing 12 and fixed relative to the column. The scale support 18 has a scale 20 mounted thereon and a reading head 22 is affixed to the bearing 12 adjacent the scale 20 wherein the relationship of the bearing to the scale may be accurately determined to achieve the desired measurement.

The scale 20 and reading head 22 may consist of any conventional type of linear measurement indicating apparatus. For instance, if only a rough measurement is desired, the scale can consist of indicia while the head 22 may consist of a vernier scale or other visually observable indicator which may be compared with the scale to determine measurement. The scale 20 and head 22 could be of an optical type utilizing light beams, lasers or lenses wherein an accurate determination between the position of the bearing 12 and the scale 20 may be measured. It is also within the scope of the invention that the scale and head be of an electrical or electronic type wherein electronic signals sensed by the head 22, determinative in valve by the scale 20, would produce an accurate and instant digital readout of the position of the bearing and gage arm 16. The particular type of scale or measuring apparatus for determining the position of the gage arm and bearing does not constitute a part of the instant invention.

Protective shield apparatus is disposed adjacent the bearing 12 and column 10 to protect the same from the adverse environment adjacent the member being measured. For instance, if the apparatus is used with a machine tool, and the finger of the gage arm is being used to measure a workpiece being turned, coolants, metal chips and smoke will be present adjacent the gage arm and such foreign matter will contaminate the guide surfaces of the column 10 and bearing 22, and the scale 20 and reading head 22. The protective apparatus utilized in the practice of the invention shields these components of the gaging apparatus from such contamination.

Figure 1:
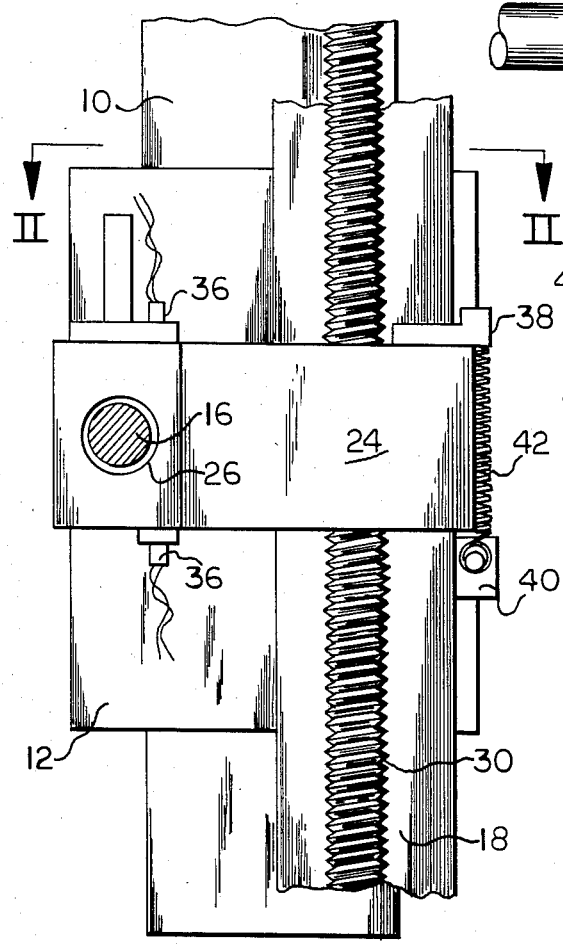
FIG. 1 is a front view of gage positioning and protective apparatus in accord with the invention.

The shielding apparatus includes a closure 24 which consists of a metal body having a cylindrical opening 26 defined therein having a slightly larger diameter than the gage arm 16, and concentrically receives the gage arm, as will be appreciated from FIG. 1.

The closure 24 has a width substantially equal to that of the air bearing 12, as noted in FIG. 2, and is provided with a threaded bore 28 which receives the threaded rod 30 disposed parallel to the column 10. The lower end of the threaded rod is connected to a stationary electric drive motor system which may be mounted on the same mounting structure as column 10 which includes a transmission 32 and reversible electric motor 34 wherein operation of the motor rotates the rod 30 to linearly displace the closure 24 in a path of movement parallel to that of the bearing 12 and gage arm 16.

A pair of electronic proximity sensing switches 36 are mounted on the closure 24 and are disposed on opposite sides of the gage arm 16 wherein the relationship of the gage arm to the closure may be very accurately sensed by the switches. The proximity switches 36 may be of the differential transformer or Hall effect type, or the like, and produce an electric signal capable of controlling the electric motor 34.

Figure 3:
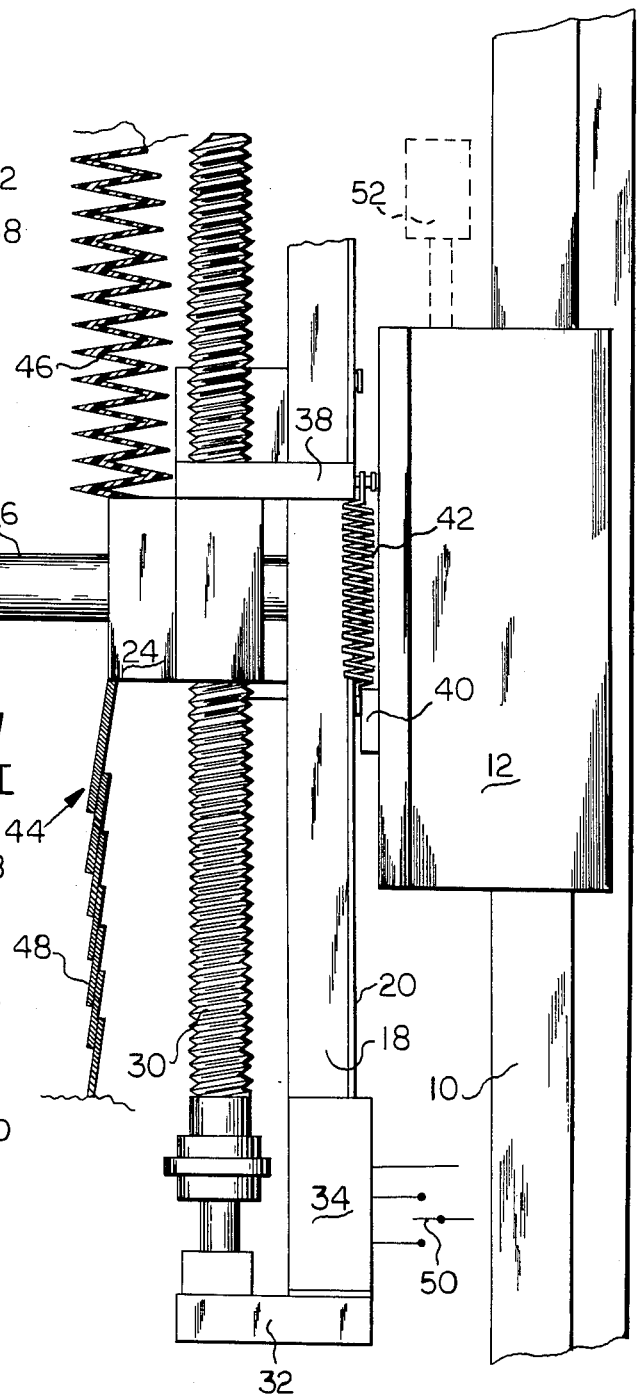
FIG. 3 is a side, elevational view of the apparatus as taken from the right side of FIG. 1.

A plurality of spring supports 38 are mounted upon the closure 24 and extend toward the bearing 12, and the bearing includes spring anchors 40, FIG. 3, wherein elongated tension srings 42 may be interposed between the closure and the bearing. These springs constitute a lost motion and counterbalance linkage between the closure and the bearing and gage arm 16 permitting the closure to be mechanically linked to the bearing and supporting the weight thereof.

Of course, to fully protect the sensitive gage structure, a screen or shield must be located between that portion of the gage arm which extends through the closure opening and the apparatus located "behind" the outer regions of the closure, and this screen or shield 44 is illustrated in FIG. 3. The shield may consist of a bellows screen 46 as shown above the closure 24, or a plurality of lapped plates 48 as shown below the closure. Bellows may be used both above and below the closure, as may the lapped plates, or other screen capable of accommodating itself to the movement of the closure. The screen must be impervious to the contaminant existing at the outer end of the gage arm 16, and will readily extend or contract as the closure 24 is translated by the electric motor 34 and threaded rod 30. The shield 44 is as high and as wide as necessary to protect the structure behind it, and it will be appreciated that the closure 24 may be completely surrounded by the flexible part of the shield.

In operation, the electric motor 34 is energized by a manual switch 50 to rotate the rod 30 and raise or lower the closure 24 as desired. This movement of the closure will result in the translation of the bearing 12 along the column 10 due to the interconnection between the closure and bearing by the springs 42, and once the gage arm 16 engages the workpiece to be measured, the weight of the gaging apparatus will be supported by the gage arm and its engagement with the workpiece. The sensors 36 are utilized to "center" the gage arm 16 within the closure opening 26 and the sensors will control motor 34 to prevent the gage arm from touching closure 24 assuring no adverse effect of the closure or shield structure upon the gage arm and an accurate measurement may be read by the reading head 22 sensing the relative position of the head to the scale 20.

When the gage arm is to be removed from the workpiece, the motor 34 will be energized to raise the gage arm from the workpiece permitting further machining, or removal from the machine tool.

The concepts of the invention are also utilized wherein separate means are employed to position the gage arm and no mechanical linkage exists between the gage structure and the protective screen components. For instance, a threaded rod or hydraulic cylinder could be used to translate the bearing 12 along the column 10, and in FIG. 3, such a hydraulic motor 52 is shown in dotted lines in a schematic manner.

In an arrangement wherein the closure 24 and gage arm 16 are independently positioned, control of the electric motor 34 will always be by the sensors 36 and as the gage arm and bearing 12 are linearly moved along the length of the column 10, the sensors 36 will sense the position of the gage arm 16 to the closure 24, and operate the motor 34 to maintain the gage arm "centered" within the closure opening 26. Thus, the closure will automatically maintain a given position with respect to the gage arm without making physical contact therewith, and regardless of the positioning of the gage arm the closure structure will not impose any forces thereon as might possibly affect the accuracy of the measurement being taken by the gage arm.

It is also envisioned that alternative apparatus can be used to move the closure 24 and shield 44 than that illustrated. For instance, a pulley system using motor driven pulleys could be used to translate cables attached to the closure. Likewise, counterbalancing of the gage arm 16 and bearing 12 can be accomplished with a counterweight attached to the bearing 12 by a cable passing over an idler pulley rotatably attached to column 10 at a location above the range of operative movement of the bearing.

It will be appreciated that the apparatus of the invention permits sensitive gage components to be effectively shielded from contamination, and by sensing the relative position between the protective structure and gage arm, the protective structure will not impose forces on the gage arm which may tend to affect the accuracy of the measurement.

It is appreciated that various modifications to the disclosed embodiments may be apparent to those skilled in the art without departing from the spirit and scope of the invention.

I claim:

1. Gage positioning apparatus comprising, in combination, a gage arm, gage arm support means supporting said arm for movement through an operative path, a protective shield having an opening defined therein receiving said gage arm, protective shield support means supporting said shield for movement through an operative path substantially corresponding to said gage arm operative path, power operated protective shield drive means operatively connected to said protective shield for moving said shield through its operative path, and sensing means sensing the relative position of said shield to said gage arm controlling said drive means preventing direct engagement of said shield with said gage arm wherein said shield is protectively associated with said gage arm without interfering with the movement thereof during gaging.

2. In gage positioning apparatus as in claim 1 wherein said protective shield drive means comprises a threaded shaft, a threaded opening defined in said protective shield receiving said threaded shaft, and an electric motor drivingly connected to said threaded shaft.

3. In gage positioning apparatus as in claim 1 wherein said protective shield includes an extendable and retractable barrier.

4. In gage positioning apparatus as in claim 3, said barrier comprising a bellows.

5. In gage positioning apparatus as in claim 3, said barrier comprising a plurality of overlapping plates.

6. In gage positioning apparatus as in claim 1, a lost motion linkage connecting said gage arm to said protective shield whereby movement of said shield moves said gage arm along its operative path.

7. In gage positioning apparatus as in claim 6, said linkage comprising a plurality of springs interconnecting said gage arm and protective shield.

8. In gage positioning apparatus as in claim 1, said sensing means being mounted upon said protective shield.

9. Gage positioning apparatus for positioning a movable gaging element extending through closely associated movably protective structure, comprising, in combination, a gage arm, gage arm support means supporting said arm for movement through an operative path, measuring means for measuring the position of said gage arm within said path, gage arm support means protective structure, said gage arm being located closely adjacent said protective structure, protective structure support means supporting said protective structure for movement through an operative path substantially corresponding to said gage arm operative path, power operated protective structure drive means operatively connected to said protective structure for moving said structure through its operative path, sensing means sensing the relative positions of said gage arm and protective structure controlling said drive means preventing direct engagement of said protective structure with said gage arm during gaging and lost motion link means connecting said protective structure to said gage arm support means whereby movement of said structure moves said gage arm support means through its operative path and said protective structure and gage arm support means are movable relative to each other along their respective operative paths.

10. In gage positioning apparatus as in claim 9, said lost motion connection comprising elongated springs interposed between said protective structure and said gage arm support means.

11. In gage positioning apparatus as in claim 10, said gage arm support means including an elongated linear bearing shaft and an air bearing mounting said gage arm upon said bearing shaft for movement thereon.

* * * * *